United States Patent
Coenen

(10) Patent No.: US 6,367,369 B1
(45) Date of Patent: Apr. 9, 2002

(54) SIDE STRUT FOR A LOWER STEERING ARM OF A TRACTOR

(75) Inventor: Herbert Coenen, Königswinter (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 09/663,514

(22) Filed: Sep. 15, 2000

(30) Foreign Application Priority Data

Sep. 17, 1999 (DE) .......................... 199 44 748

(51) Int. Cl.[7] .................................. F16J 1/10
(52) U.S. Cl. ........................................ 92/129
(58) Field of Search .......................... 92/129, 140

(56) References Cited

U.S. PATENT DOCUMENTS 3,058,458 A * 10/1962 Gray ........................ 92/129
5,462,303 A * 10/1995 Langen et al. ............. 280/455.1
6,283,481 B1 * 9/2001 Johnson et al. ......... 280/86.758

FOREIGN PATENT DOCUMENTS

| DE | 195 37 555 A1 | 4/1997 |
| DE | 197 44 328 C1 | 10/1998 |
| DE | 197 37 318 A1 | 3/1999 |

* cited by examiner

*Primary Examiner*—Edward K. Look
*Assistant Examiner*—Igor Kershteyn
(74) *Attorney, Agent, or Firm*—Harness, Dickey & Pierce, P.L.C.

(57) ABSTRACT

A side strut (5) for a lower steering arm of a tractor has a single-action hydraulic cylinder with a cylinder housing (9) and a piston (16). The piston includes a hollow cylinder (17) with a base (18). In the hollow cylinder (17), a rod-shaped element (20) is adjustable against the force of a spring from a moved-in position into a moved-out position. Because the piston (16) and the setting element (20) move in the same direction, it is possible to achieve a telescopic design which leads to a short installation length which, in turn, results in a more advantageous buckling strength.

7 Claims, 2 Drawing Sheets

US 6,367,369 B1

SIDE STRUT FOR A LOWER STEERING ARM OF A TRACTOR

CROSS-REFERENCE TO RELATED APPLICATION

This application is based upon and claims priority to German Patent Application 199 44 748.9 filed Sep. 17, 1999, which application is herein expressly incorporated by reference.

BACKGROUND OF THE INVENTION

The invention relates to a side strut for a lower steering arm of a tractor. Side struts are used to at least temporarily stabilize lateral pivotable lower steering arms of a tractor. Side struts prevent the lower steering arms from being pivoted. The side struts are designed such that, when an implement is lifted, the implement and the lower steering arms are automatically centered centrally relative to the longitudinal axis of the tractor. Furthermore, the side struts serve to hold the lower steering arms at a predetermined distance from one another in accordance with the category of the to be attached implement. This enables the implement to be coupled automatically from the driver's seat.

DE 197 37 318 A1 discloses an assembly where one lower steering arm of a tractor attaching device is associated with a single-action, double-stage telescopic cylinder. The other lower steering arm is associated with a single-action, single-state hydraulic cylinder in the form of a side strut. The piston rod of the single-stage hydraulic cylinder includes a bore with a freely movable guiding rod. At its free end, the guiding rod or the piston rod of one of the two cylinders includes a thread to receive an attaching element to connect to the lower steering arm. The attaching element can be threaded over a shorter or longer distance. One stage of the double-stage telescopic cylinder serves to compensate for any play and to adapt to a certain category. A tension spring is arranged between the attaching means associated with the piston rod and the outside of the cylinder housing. The tension spring loads the pistons and the guiding rod to enable them to assume their moved-in positions. The tension spring is arranged eccentrically relative to the longitudinal axis of the side strut. In consequence, the spring is unprotected, so that the dimension of spread between the two lower steering arms changes if no implement is attached. In order to couple the implement, the correct dimension of spread has to be re-set. Furthermore, the effect of the spring may be adversely affected by rough operating conditions.

DE-GM 19 749 38 describes side struts that are associated with the lower steering arms of a tractor. Each side strut has a tube with a first attaching means and an adjustable journal. The adjustment is limited by stops. A further attaching means is also provided. If the lower steering arms are connected to one another by a liftlink drawbar, the connection with the lower steering arms can be effected to ensure free lateral movability or that such movability is eliminated. In addition, any play can be compensated for by the play of the thread. A central setting effect from a certain lifted position of the lower steering arm onwards is not possible.

DE 197 44 328 C1 describes a side strut which can be used for the lower steering arms of a tractor. The side strut has a single-action hydraulic cylinder with a piston and a cylinder housing. One end of a piston rod associated with the piston projects from the cylinder housing. The rod carries a first attaching means which is connected to a corresponding attaching means at the rear of the tractor.

The cylinder housing is axially followed by a hollow cylinder. An adjustable rod-shaped setting element is arranged in the hollow cylinder. The setting element is guided in the hollow cylinder by two spaced guiding rings. A pressure spring is arranged between the guiding rings. The spring is loaded into a moved-in position in which the setting element, by means of one end face, is supported against the base of the cylinder housing. The piston and the setting element can be moved out in opposite directions. The end of the setting element projects from the hollow cylinder when the setting element is moved in. The setting element includes a threaded bore which is engaged by a threaded rod. The second attaching means is attached to the threaded rod and is connectable to the associated lower steering arm. The basic axial length resulting from arranging the cylinder housing, the hollow cylinder, and the setting device for the category setting means with the threaded bore and the threaded bar one behind the other is too great for the installation conditions prevailing in modern tractors. Thus, the pivoting path of the lower steering arm is restricted.

SUMMARY OF THE INVENTION

It is an object of the invention to provide a side strut which is as short as possible. Also, a side strut is provided where the position of the piston in the cylinder housing remains unaffected by the spring.

In accordance with the invention, a side strut includes a single-action hydraulic cylinder. The single-action hydraulic cylinder has a cylinder housing, a piston including a hollow cylinder and a base closing one end of the hollow cylinder. The end of the piston with the base enters the cylinder housing. The hollow cylinder is guided out of the cylinder housing. The piston in the cylinder housing is movable along a longitudinal axis. The single-action hydraulic cylinder, further includes a first attaching means. The side strut further includes a setting means. The setting means includes a rod-shaped setting element arranged in the hollow cylinder. The rod-shaped element is co-axially arranged in the hollow cylinder and rotatable around the longitudinal axis. The rod-shaped element is also adjustable relative to the hollow cylinder between a first position, where it is moved into the hollow cylinder, and a second position, where it is moved out of the hollow cylinder. The setting element has a threaded bore arranged and centered on the longitudinal axis. The threaded bore starts from a second end face which projects from the open end of the hollow cylinder. The setting means further includes a spring means arranged in the hollow cylinder around the setting element. The spring means is effective between the piston and the setting element only. The spring means loads the setting element to enable the setting element to assume the moved-in position. The setting element, via a first end face, is in contact with the base face of the base of the piston in the moved-in position. The spring means allow the setting element to be adjusted in a direction which corresponds to the direction in which the piston is moved out of the cylinder housing. The setting means further include an actuating means to enable rotational displacement of the setting element. The setting means further includes a threaded rod connected to the second attaching means. The threaded rod is displacably received in the threaded bore of the setting element.

The telescopic design achieves short lengths between the attaching means. As a result, when use is made of the lower steering arms of a tractor, the lower steering arms include a great lateral freedom of movement. In addition, because the piston and the setting element move in the same direction when they are moved out, a short buckling length is achieved. This is advantageous from a buckling strength viewpoint. It is also advantageous that the spring means is protected. Thus, when the setting element is in the moved-in condition, the spring means hold the setting element by a first end face in contact with the base face of the base of the piston. The thread enables an adjustment to a certain category and to eliminate play when the implement is coupled. The spring only serves to adjust the setting element. It has no influence on the position of the piston in the cylinder.

According to a preferred embodiment, a setting element is guided through two guiding rings in the hollow cylinder. A first guiding ring and a second guiding ring are arranged on the outer face of the setting element. The compact arrangement is further improved by securing the first guiding ring in the hollow cylinder at the end removed from the cylinder housing in the moving-out direction of the setting element. The second guiding ring is secured at the end of the setting element, which faces the base of the piston, in a direction corresponding to the moving-in direction of the setting element. The spring means is arranged between the two guiding rings and between the outer face of the setting element and the inner face of the hollow cylinder. The spring means is in the form of a pressure element. The setting element is rotatably held in the two guiding rings.

By rotating the setting element, the length between the attaching means is changed. To facilitate such rotation, the actuating means are provided by an actuating lever attached to the setting element end which projects from the hollow cylinder. The actuating lever can be secured to the holding means in order to prevent any unintentional adjustment.

The first attaching means is preferably connected to the cylinder housing. A particularly compact design is achieved by arranging the threaded bore in the setting element such that, in the moved-in condition of the setting element, the setting element is at least partially positioned inside the hollow cylinder and thus inside the piston. Extremely short lengths are achieved so that a particularly advantageous short buckling length is also achieved.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the invention is illustrated in the drawings wherein.

DETAILED DESCRIPTION OF THE PREFERRED EMBODIMENT

Figure 1:
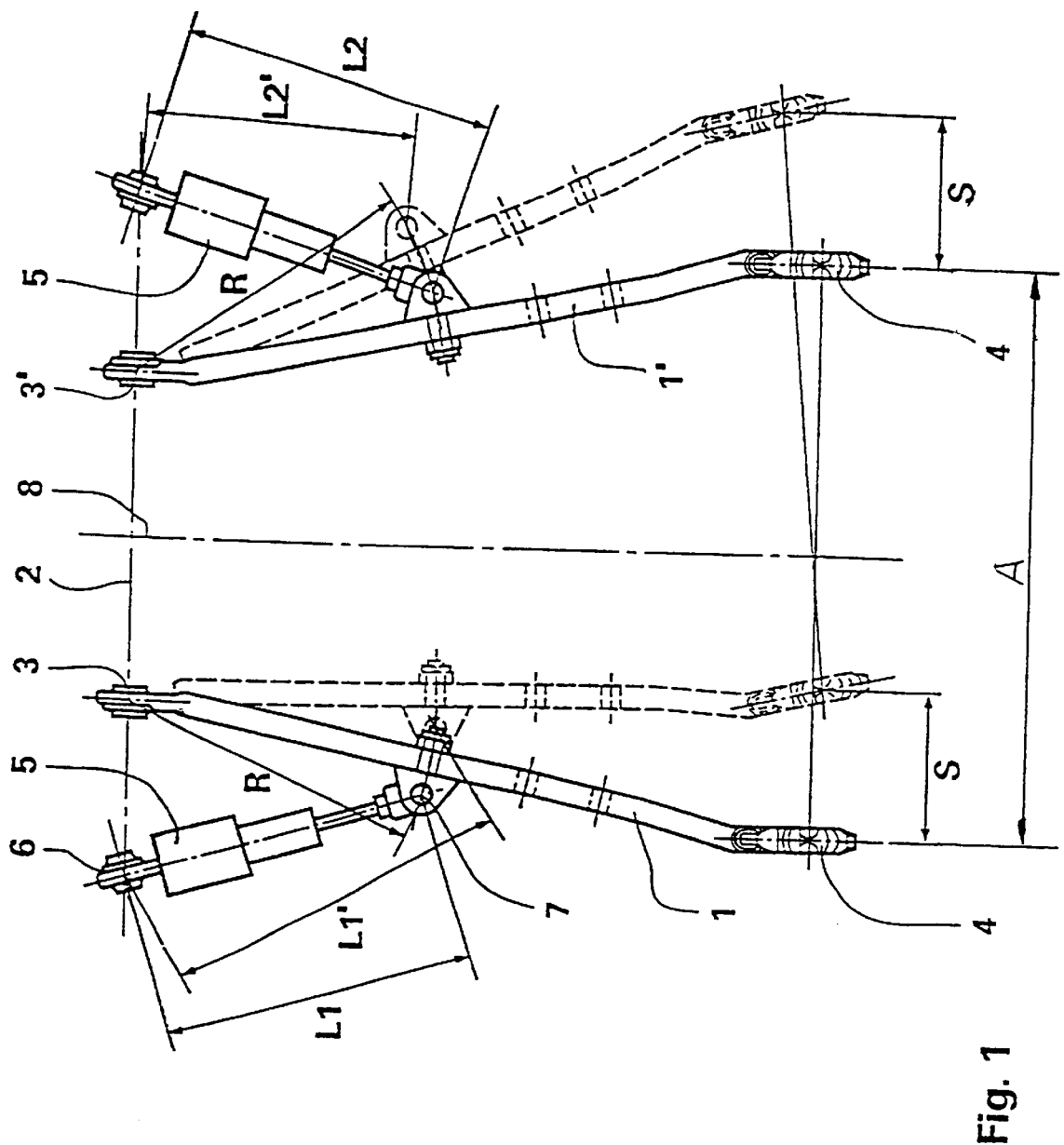
FIG. 1 is a diagrammatic plan view of the lower steering arms of a three-point attaching device of a tractor with the side struts associated with the lower steering arms.

FIG. 1 shows a diagrammatic plan view of two lower steering arms 1, 1' attached by suitable attaching means at the fixing points 3, 3' at the rear of the tractor. The arms 1, 1' are pivotable around a pivot axis 2. The two fixing points 3, 3' are laterally offset from the longitudinal tractor axis 8 by equal amounts. The two lower steering arms 1, 1' are able to carry out both lateral and lifting movements. The arms pivot around the pivot axis upward and downward, out of and into the drawing plane. This is shown in FIG. 1 from the position shown in continuous lines into the position shown in dashed lines.

Coupling hooks 4 are provided to prevent lateral movements of the two lower steering arms 1, 1'. The coupling hooks 4 receive corresponding coupling means at the implement to pull the implement or to carry the implement in cooperation with an upper steering arm (not illustrated). The upper steering arm is normally centered on the longitudinal tractor axis 8 above the pivot axis 2. The one end of the two side struts 5 are secured by a first attaching means 6 to a suitable fixing means at the rear of the tractor. The fixing means are centered on the pivot axis 2. The side struts are laterally offset relative to the fixing points 3, 3'. A second attaching means 7, at the other ends of the side struts 5, connects the side struts to a lower steering arm 1, 1'. The attaching means 6, 7 enable a pivot movement. Furthermore, as can be seen in FIG. 1, the pivot axes of the attaching means 7 are arranged at a radius R relative to the fixing points 3, 3'. Thus, the attaching means 7 carry out a pivot movement with the radius R.

If, with an attached implement, a side movement S occurs at the two lower steering arms 1, 1', with the two lower steering arms 1, 1' being displaced from the position shown in continuous lines into the position shown in dashed lines, a length change occurs for the two lower steering arms 1, 1'. Starting from identical distances L1 and L2 between the pivot axes of the articulation points 6, 7, the dimension L is increased to L1', whereas the dimension L2 is shortened to dimension L2'. The changes in length vary with respect to magnitude. If the lower steering arms 1, 1' pivoted clockwise around the fixing points 3, 3', the length L1 would be shortened and the length L2 would be lengthened. When shortening takes place, care must be taken to ensure that the lower steering arm 1', in its dashed position, does not hit the rear wheels.

Furthermore, the two side struts 5 hold the attached implement centered on the longitudinal tractor axis 8 when the attached implement is in the lifted transport position. The same applies if no implement is attached and if the lower steering arms 1, 1' are in the transport position. In this condition, the two side struts ensure that the lower steering arms 1, 1' are held so that they cannot move sideways from the set dimension of spread A from the longitudinal tractor axis 8 outwardly towards the rear wheels. The dimension of spread A between the coupling hooks 4 of the two lower steering arms 1, 1' can be manually set. Here, a settable telescopic setting means is integrated into the side struts 5 if to be coupled implements are in a category that deviates from the set category.

Figure 2:
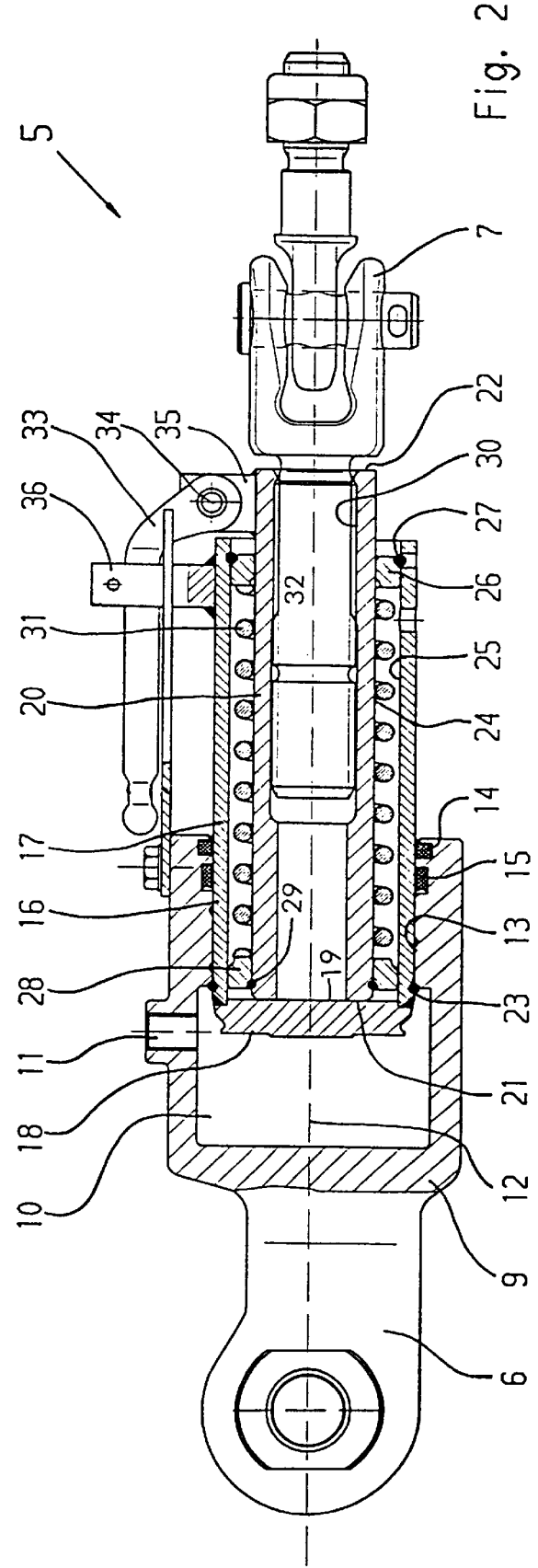
FIG. 2 is a longitudinal section view through a side strut.

FIG. 2 shows an enlarged longitudinal section through a side strut 5 of FIG. 1. The side strut 5 includes a single-action hydraulic cylinder with a cylinder housing 9 and a piston 16. The cylinder housing 9 has a cylinder chamber 10. At one end, the cylinder chamber 10 is closed by a base. At the other end, the cylinder chamber 10 includes a guiding bore 13 centered on the longitudinal axis 12. An attaching bore 11 leads into the cylinder chamber 10. A pressure agent line can be connected to the attaching bore 11. The pressure agent line is either connected to the lifting mechanism of the tractor for the lower steering arms, or it is connected to a separate pressure source with incorporated control elements.

The first attaching means 6, in the form of a ball eye, is attached to the cylinder housing 9. A stripper 14 and a seal 15, one positioned behind the other, are arranged at the end of the guiding bore 13, remote from the first attaching means 6. The piston 16 has a hollow cylinder 17. The hollow cylinder 17 is closed at one end by a base 18. The base face 18 point towards the interior of the hollow cylinder. The outer face of the hollow cylinder 17, toward the base 18, includes a groove which is engaged by a stop ring 23. The stop ring 23 delimits the outward movement of the piston 16 out of the cylinder housing 9.

FIG. 2 shows the piston 16 in its furthest moved-out position. The piston 16 is supported via the stop ring 23 against a corresponding face in the region of transition between the cylinder chamber 10 and the guiding bore 13. A rod-shaped, especially tube-shaped setting element 20, is received in the hollow cylinder 17. The setting element 20 is adjustable along the longitudinal axis 12. FIG. 2 shows the setting element 20 in its moved-in position relative to the piston 16 and the hollow cylinder 17. The setting element 20, via its first end face 21, rests against the base face 19.

The setting element 20 is guided relative to the hollow cylinder 17 by two guiding rings 26, 28. The guiding rings 26, 28 are positioned on the outer face 24 of the hollow cylinder 17. The first guiding ring 26 is arranged near the end of the hollow cylinder 17. The end is removed from the base 18. The first guiding ring 26 is guided on the inner face 25 of the hollow cylinder 17. The first guiding ring 26 is also in contact with a securing ring 27 secured in the hollow cylinder 17. Thus, the first guiding ring 26 cannot be moved out of the hollow cylinder 17. The second guiding ring 28 is arranged near the base 18 and secured to the outer face 24 of the setting element 20 towards the base 18 by a securing ring 29. The second guiding ring 28 is guided on the inner face 25 of the hollow cylinder 17.

Spring means is arranged between the two guiding rings 26, 28. The spring means is in the form of a pressure spring 31. The first end face 21 of the setting element is held by the pressure spring 31 in contact with the base face 19. The pressure spring 31 is co-axially arranged around the setting element 20 and is arranged in the hollow cylinder 17.

The setting element 20 includes a continuous bore centered on the longitudinal axis 12. Part of the bore, starting from the second end face 22 of the setting element 20, includes a threaded bore 30. A threaded rod 32 is adjustably received in the bore 30. In the moved-in condition of the setting element 20, the threaded bore 30, relative to the hollow cylinder 17, is arranged with part of its length in the hollow cylinder 17. In the moved-in condition, a small part of the setting element 20 axially projects beyond the end of the hollow cylinder 17, which end faces away from the base 18.

A holding device 35 is secured to the setting element near the second end. An actuating lever 33 is secured to the holding device 35. The lever 33 is pivotable around the pivot axis 34. In the inactive condition, which is shown in FIG. 2, the actuating lever 33 is positioned between two yoke arms of a first holding element 36. The lever is held by the setting element 20 so as to be non-rotatable relative to the piston 16. Thus, the setting element 20 cannot be rotated around the longitudinal axis 12. Furthermore, the threaded rod 32 carries the second attaching means. The second attaching means 7 attaches to a lower steering arm. The telescopic design achieves an extremely short installation length.

While the above detailed description describes the preferred embodiment of the present invention, the invention is susceptible to modification, variation and alteration without deviating from the scope and fair meaning of the subjoined claims.

What is claimed is:

1. A side strut for a lower steering arm of a tractor, comprising:

a single-action hydraulic cylinder including a cylinder housing;

a piston including a hollow cylinder and a base closing one end of said hollow cylinder, the end of the piston provided with the base enters the cylinder housing, the hollow cylinder of the piston is guided out of the cylinder housing and the piston in the cylinder housing is movable along a longitudinal axis, and said single-action hydraulic cylinder includes first attaching means, said side strut further comprising setting means, said setting means including a rod-shaped setting element co-axially arranged in the hollow cylinder so as to be rotatable around the longitudinal axis, said rod-shaped setting element being adjustable relative to the hollow cylinder between a position where the rod-shaped setting element is moved into the hollow cylinder and a position where the rod-shaped setting element is moved out of said hollow cylinder, said setting element including a threaded bore centered on the longitudinal axis, said threaded bore starting from a second end face of said setting element projecting from an open end of the hollow cylinder;

said setting means further including a spring means arranged in the hollow cylinder around the setting element, said spring means being effective between the piston and the setting element only, said spring means loads the setting element to enable said setting element to assume the moved-in position wherein a first end face is in contact with a base face of the base of the piston and enabling the setting element to be adjusted against the force of the spring means in a direction which corresponds to the direction in which the piston is moved out of the cylinder housing;

said setting means further including actuating means to rotationally displace the setting element and a threaded rod connecting second attaching means and said attaching means being displacably received in the threaded bore of the setting element.

2. A side strut according to claim 1, wherein in the hollow cylinder, the rod-shaped setting element is guided through a first guiding ring and a second guiding ring which are arranged on an outer face of the setting element.

3. A side strut according to claim 2, wherein the first guiding ring is secured in the hollow cylinder at the end removed from the cylinder housing in the moving-out direction of the setting element and that the second guiding ring is secured at the end of the setting element which faces the base of the piston in a direction corresponding to the moving-in direction of the setting element and the spring means being a pressure spring arranged between the two guiding rings and between the outer face of the setting element and the inner face of the hollow cylinder.

4. A side strut according to claim 2, wherein the setting element is arranged in the guiding rings so as to be rotatable around the longitudinal axis.

5. A side strut according to claim 1, wherein in the moved-in position of the setting element, the threaded bore of the setting element is at least partially positioned in the hollow cylinder.

6. A side strut according to claim 1, wherein the actuating means comprises an actuating lever which is attached to the end of the setting element which projects from the hollow cylinder.

7. A side strut according to claim 1, wherein the first attaching means being connected to the cylinder housing.

* * * * *